(12) United States Patent
Xue et al.

(10) Patent No.: US 12,104,996 B2
(45) Date of Patent: Oct. 1, 2024

(54) FLAT PLATE SAMPLE HOLDER EXPANSION STRUCTURE USED IN VACUUM

(71) Applicant: TSINGHUA UNIVERSITY, Beijing (CN)

(72) Inventors: Qi-Kun Xue, Beijing (CN); Xiao-Peng Hu, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 958 days.

(21) Appl. No.: 17/124,500

(22) Filed: Dec. 17, 2020

(65) Prior Publication Data

US 2021/0102874 A1    Apr. 8, 2021

Related U.S. Application Data

(63) Continuation of application No. PCT/CN2018/092912, filed on Jun. 26, 2018.

(30) Foreign Application Priority Data

Jun. 21, 2018  (CN) .......................... 201810644266.8

(51) Int. Cl.
  *G01N 1/36*    (2006.01)
  *B01L 9/00*    (2006.01)
  *B01L 9/06*    (2006.01)

(52) U.S. Cl.
  CPC .................. *G01N 1/36* (2013.01); *B01L 9/06* (2013.01); *B01L 9/52* (2013.01)

(58) Field of Classification Search
  CPC .... B01L 9/06; B01L 9/52; G01N 1/00; G01N 1/36; G01N 23/2204
  See application file for complete search history.

(56) References Cited

FOREIGN PATENT DOCUMENTS

| CN | 101846635 | 9/2010 |
|---|---|---|
| CN | 202041548 | 11/2011 |
| CN | 204374062 | 6/2015 |
| CN | 107664678 | 2/2018 |

(Continued)

OTHER PUBLICATIONS

Takashi JP H11-30573 A published Feb. 2, 1999, English translation (Year: 2024).*

(Continued)

*Primary Examiner* — Christine T Mui
*Assistant Examiner* — Jonathan Bortoli

(57) ABSTRACT

A flat plate sample holder expansion structure used in a vacuum is configured to convey a flat plate sample holder in a vacuum environment, and detachably attached to a flat plate sample holder tray through an adapter. A receiving space for receiving the flat plate sample holder is provided between the adapter and the flat plate sample holder tray. The flat plate sample holder is detachably arranged in the receiving space. A cylindrical sample holder gripper is detachably connected to the adapter. The cylindrical sample holder gripper conveys the flat plate sample holder and samples thereon into a low-temperature, high-intensity magnetic field apparatus, thereby realizing an objective of replacing samples in the vacuum environment. A vacuum test platform is built by combining the apparatuses using the two types of sample holders.

10 Claims, 5 Drawing Sheets

(56) References Cited

FOREIGN PATENT DOCUMENTS

| | | |
|---|---|---|
| CN | 107677771 | 2/2018 |
| EP | 3101433 A1 * | 12/2016 ........... G01Q 10/065 |
| JP | H1130573 A * | 2/1999 |
| WO | WO2011014315 | 2/2011 |

OTHER PUBLICATIONS

International Search Report of PCT/CN2018/092912 The date of the ISR is Dec. 22, 2020.

* cited by examiner

FLAT PLATE SAMPLE HOLDER EXPANSION STRUCTURE USED IN VACUUM

CROSS-REFERENCE TO RELATED APPLICATIONS

This application claims all benefits accruing under 35 U.S.C. § 119 from China Patent Application No. 201810644266.8, filed on Jun. 21, 2018 in the China National Intellectual Property Administration, the entire content of which is hereby incorporated by reference. This application is a continuation under 35 U.S.C. § 120 of international patent application PCT/CN2018/092912, entitled "Flat Plate Sample Holder Expansion Structure Used in Vacuum" filed on Jun. 26, 2018, the content of which is also hereby incorporated by reference.

TECHNICAL FIELD

The present invention relates to the field of vacuum instruments, and in particular, to a flat plate sample holder expansion structure used in a vacuum.

BACKGROUND

In a commonly used ultra-high vacuum testing apparatus, a sample is often fixed on a flat plate sample holder and transferred to the apparatus for a test. Sample heating tables and sample rotating tables of many testing apparatuses are also designed and manufactured based on the flat plate sample holder. Moreover, the flat plate sample holder occupies a small space, has a small heat capacity, and is very suitable for use in a low-temperature apparatus, such as ARPES, MBE, or the like. However, there is also a type of vacuum, low-temperature, high magnetic field testing apparatus whose testing device is disposed in a cryogenic storage dewar, for which the flat plate sample holder may not be smoothly transferred to a position for the test. Therefore, a cylindrical sample holder is often used to fix the sample and is inserted into the test position. However, it is very difficult to combine the apparatuses using the above-mentioned two types of sample holders to build a vacuum testing platform.

SUMMARY

In view of this, it is necessary to provide a flat plate sample holder expansion structure, to solve a problem that an existing cylindrical sample holder gripper may not transfer a flat plate sample holder and a sample thereon to a low-temperature, high-intensity magnetic field apparatus to realize sample replacement in a vacuum environment.

The objective above is realized by the following technical solutions.

A flat plate sample holder expansion structure used in a vacuum includes an adapter detachably connected to a cylindrical sample holder gripper, and a flat plate sample holder tray. The adapter is detachably attached to the flat plate sample holder tray.

A receiving space for receiving a flat plate sample holder is provided between the adapter and the flat plate sample holder tray, and the flat plate sample holder is detachably and rigidly arranged in the receiving space.

In one of the embodiments, the flat plate sample holder expansion structure used in the vacuum further includes a fastening element.

The flat plate sample holder tray defines an opening, and a stepped surface is disposed on a side wall of the opening.

The adapter is substantially an I-shaped structure, and a through hole is defined in a center of the I-shaped structure.

The fastening element is configured to pass through the through hole and abut on the flat plate sample holder after the flat plate sample holder is installed on the stepped surface.

In one of the embodiments, the fastening element is a fastening screw, the through hole is a threaded hole fitting the fastening screw, and the fastening screw is configured to be screwed into the threaded hole to abut on the flat plate sample holder.

In one of the embodiments, a head portion of the I-shaped structure is disc-shaped, protruding rods are arranged on an outer side wall of the disc-shaped head portion, and the cylindrical sample holder gripper is detachably connected to the adapter by the protruding rods.

In one of the embodiments, a rear portion of the I-shaped structure is cylindrical, and threaded holes are evenly arranged in a side wall of the cylindrical rear portion and configured to connect the flat plate sample holder tray.

In one of the embodiments, locking ears extending outward in a radial direction are provided on the side wall of the rear portion, and a cylindrical sample holder locking base is detachably connected to the adapter by the locking ears.

In one of the embodiments, projections of each protruding rod and a corresponding locking ear, which are projected on a top surface of the cylindrical rear portion, are located in a radial straight line on the cylindrical rear portion.

In one of the embodiments, a notch is defined by the side wall of the rear portion and located at a position corresponding to the opening defined by the flat plate sample holder tray. The notch is capable of receiving a front end of the sample holder gripper, and the flat plate sample holder gripper is configured to extend into the notch to install and remove the flat plate sample holder.

In one of the embodiments, materials of the adapter and the flat plate sample holder tray are non-magnetic, thermal conducting materials.

In the flat plate sample holder expansion structure used in the vacuum, the adapter is detachably attached to the flat plate sample holder tray. The receiving space for receiving the flat plate sample holder is provided between the adapter and the flat plate sample holder tray. The flat plate sample holder is detachably arranged in the receiving space. The cylindrical sample holder gripper is capable of being detachably connected to the adapter. The cylindrical sample holder gripper transfers the flat plate sample holder and the sample thereon to the low-temperature, high-intensity magnetic field apparatus, thereby achieving the objective of replacing samples in the vacuum environment. A vacuum test platform is built by combining two types of sample holders above.

BRIEF DESCRIPTION OF THE DRAWINGS

In order to make the present invention to be understood easily and clearly, the embodiments of the present invention will be further described in detail with reference to the accompanying drawings.

DETAILED DESCRIPTION OF THE EMBODIMENTS

In order to make the objectives, technical solutions and advantages of the present invention clearer, embodiments of the present invention will be further described in detail below with reference to the accompanying drawings.

Referring to FIGS. 1 to 4, a flat plate sample holder expansion structure used in a vacuum includes an adapter 100 and a flat plate sample holder tray 200. The adapter 100 is detachably attached to the flat plate sample holder tray 200. A receiving space for fixing a flat plate sample holder 300 is provided between the adapter 100 and the flat plate sample holder tray 200. The flat plate sample holder 300 is detachably and rigidly arranged in the receiving space, and the adapter 100 is capable of being detachably connected to a cylindrical sample holder gripper 400. The cylindrical sample holder gripper 400 is capable of clutching the adapter 100 and carrying the flat plate sample holder 300 to move through the detachably connection to the adapter 100.

Optionally, the receiving space may be formed only by the flat plate sample holder tray 200, or may be formed by the flat plate sample holder tray 200 together with the adapter 100, as long as the receiving space is large enough to receive the flat plate sample holder 300.

Figure 1:
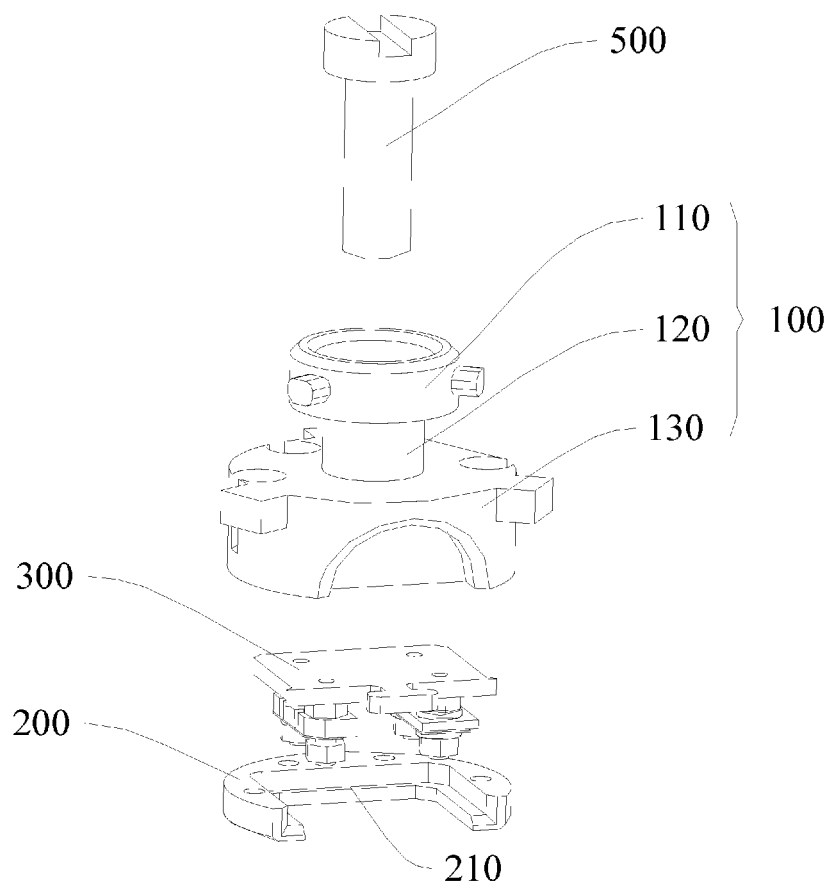
FIG. 1 is a first exploded view of a flat plate sample holder expansion structure used in a vacuum according to an embodiment of the present disclosure.
Figure 2:
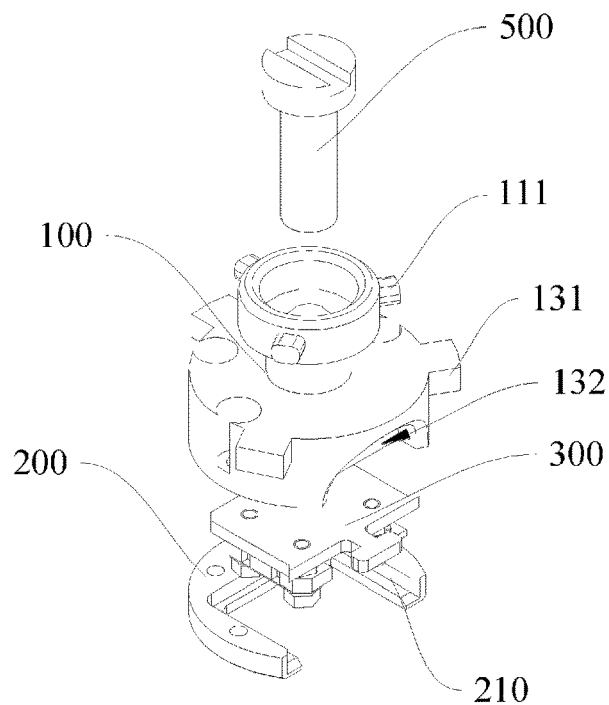
FIG. 2 is a second exploded view of the flat plate sample holder expansion structure used in the vacuum according to an embodiment of the present disclosure.
Figure 3:
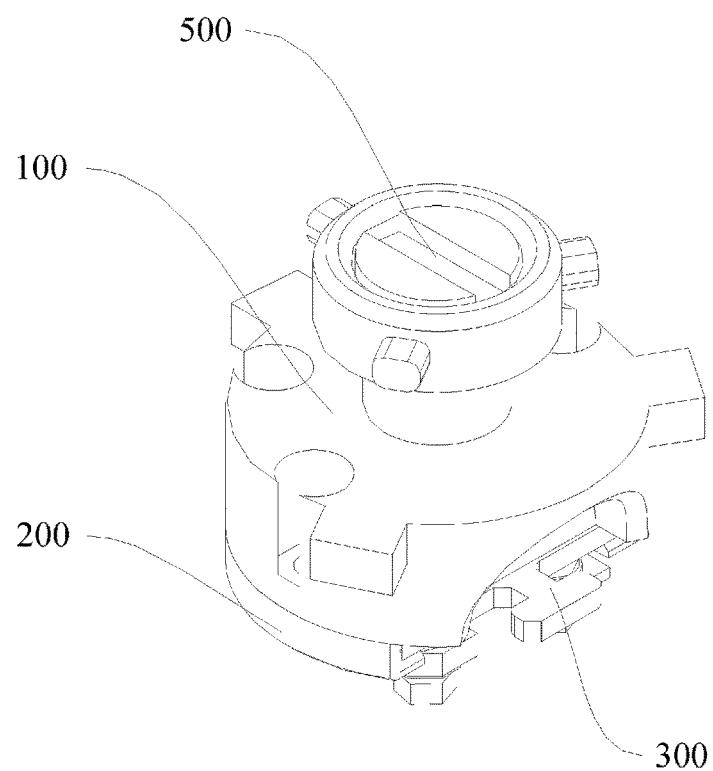
FIG. 3 is a schematic assembly drawing of the flat plate sample holder expansion structure used in the vacuum according to an embodiment of the present disclosure.
Figure 6:
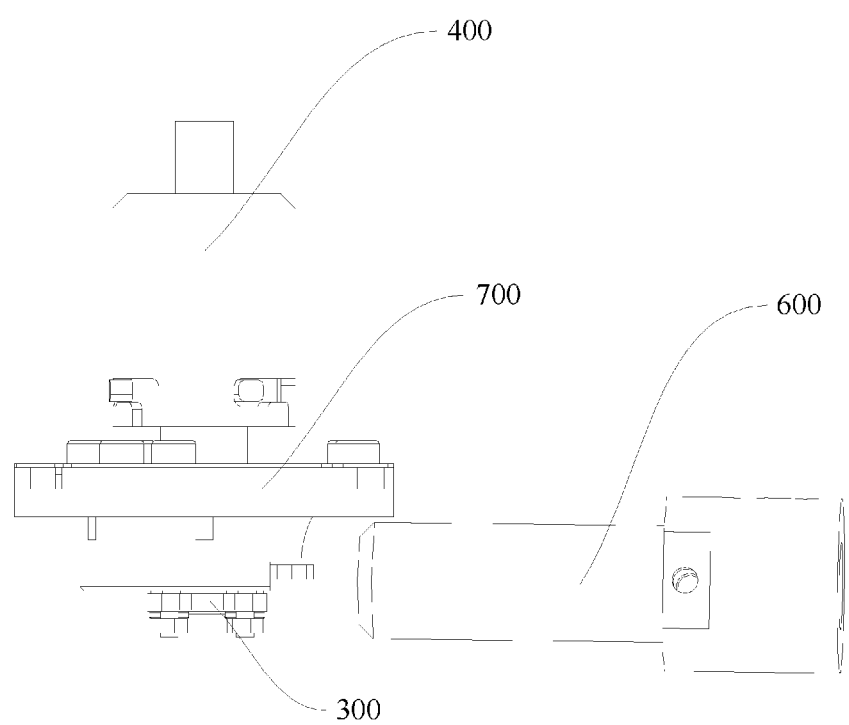
FIG. 6 is an assembly drawing of the flat plate sample holder expansion structure used in the vacuum according to an embodiment of the present invention, which shows the flat plate sample holder installed on the cylindrical sample holder locking base.

Referring to FIGS. 1, 2 and 6, in one of the embodiments, the flat plate sample holder expansion structure used in the vacuum further includes a fastening element 500. The flat plate sample holder tray 200 defines an opening, and the opening is configured to arrange and receive the flat plate sample holder 300. That is, the receiving space is formed by the opening defined by the flat plate sample holder tray 200, and a stepped surface 210 is disposed on a side wall of the opening and configured to support the flat plate sample holder 300. The stepped surface fits a contour of the flat plate sample holder 300, so as to support and position the flat plate sample holder 300. A flat plate sample holder gripper 600 is capable of arranging the flat plate sample holder 300 on the stepped surface 210 or detaching the flat plate sample holder 300 away from the stepped surface 210. The adapter 100 is approximate to an I-shaped structure. A through hole is defined in a center of the I-shaped structure, and the through hole penetrates through a head portion, a neck portion, and a rear portion of the I-shaped structure of the adapter 100. After the flat plate sample holder 300 is arranged on the stepped surface 210, the fastening element 500 passes through the through hole and abuts on the flat plate sample holder 300. Under a joint action of the stepped surface 210 and the fastening element 500, the flat plate sample holder 300 is fixed inside the adapter 100.

Optionally, the fastening element 500 is a fastening screw, and the through hole is a threaded hole. After the flat plate sample holder 300 is arranged on the stepped surface 210, the fastening screw is screwed into the threaded hole, and an end of the fastening screw abuts on the upper surface of the flat plate sample holder 300, so that the flat plate sample holder 300 is fixed between the adapter 100 and the flat plate sample holder tray 200. The cylindrical sample holder gripper 400 can transfer the flat plate sample holder 300 by clutching the adapter 100.

Referring to FIGS. 1 and 2, in one of the embodiments, the I-shaped structure includes the head portion 110, the neck portion 120, and the rear portion 130. The head portion 110 and the rear portion 130 are fixedly connected to two ends of the neck portion 120, respectively. The head portion 110 is disc-shaped, and protruding rods 111 are arranged on an outer side wall of the disc-shaped head portion 110. The cylindrical sample holder gripper 400 is detachably connected to the adapter 100 by means of grasping the protruding rods 111.

Optionally, the number of the protruding rods 111 is three, and the three protruding rods 111 are evenly arranged on the outer side wall of the disc-shaped head portion 110. The cylindrical sample holder gripper 400 is provided with position locking components corresponding to the protruding rods 111 respectively, and each position locking component includes an insertion part and a fastening part. After the protruding rod 111 is inserted into the insertion part, the cylindrical sample holder gripper 400 is rotated to enable the protruding rod 111 to enter the fastening part. After the fastening part fastens the protruding rod 111, the cylindrical sample holder gripper 400 clutches the adapter 100 to move the adapter 100.

Referring to FIG. 1, in one of the embodiments, the rear portion 130 of the I-shaped structure is cylindrical, and a top wall of the cylindrical rear portion 130 is fixedly connected to the head portion 110 by means of the neck portion 120 of the I-shaped structure. Threaded holes are evenly arranged on the side wall of the cylindrical rear portion 130 and configured for the connection to the flat plate sample holder tray 200, and threaded holes are also provided at corresponding positions on the flat plate sample holder tray 200. The flat plate sample holder tray 200 and the cylindrical rear portion 130 are fixedly connected together by means of threaded connection.

Figure 4:
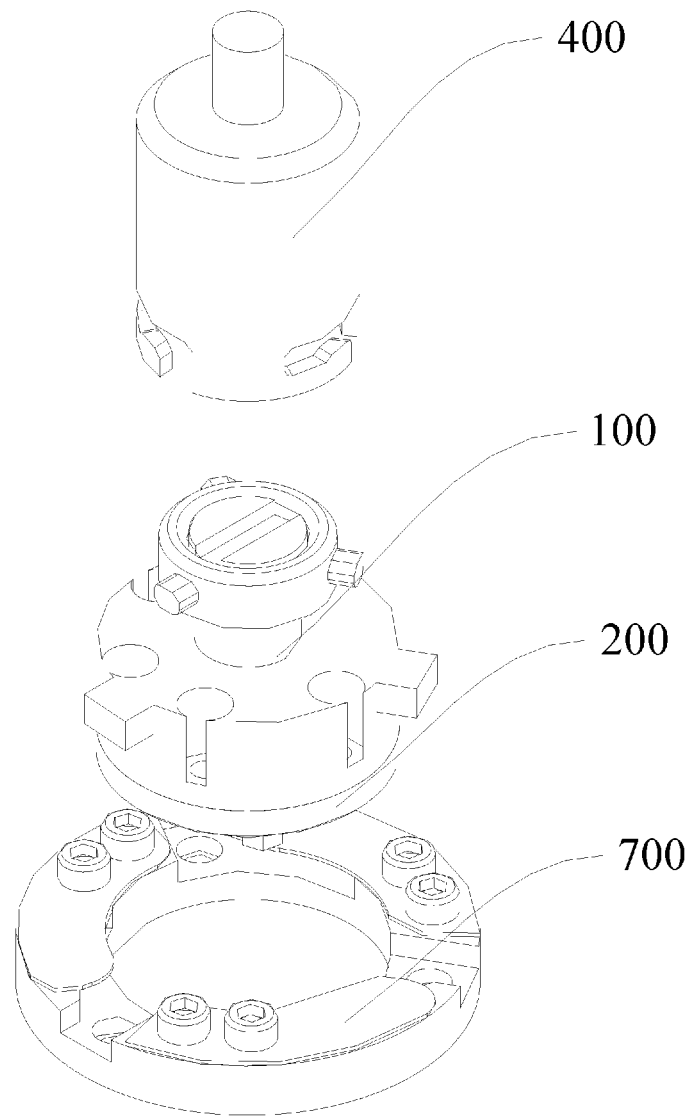
FIG. 4 is a first exploded view of the flat plate sample holder expansion structure used in the vacuum including a cylindrical sample holder gripper and a cylindrical sample holder locking base according to an embodiment of the present disclosure.
Figure 5:
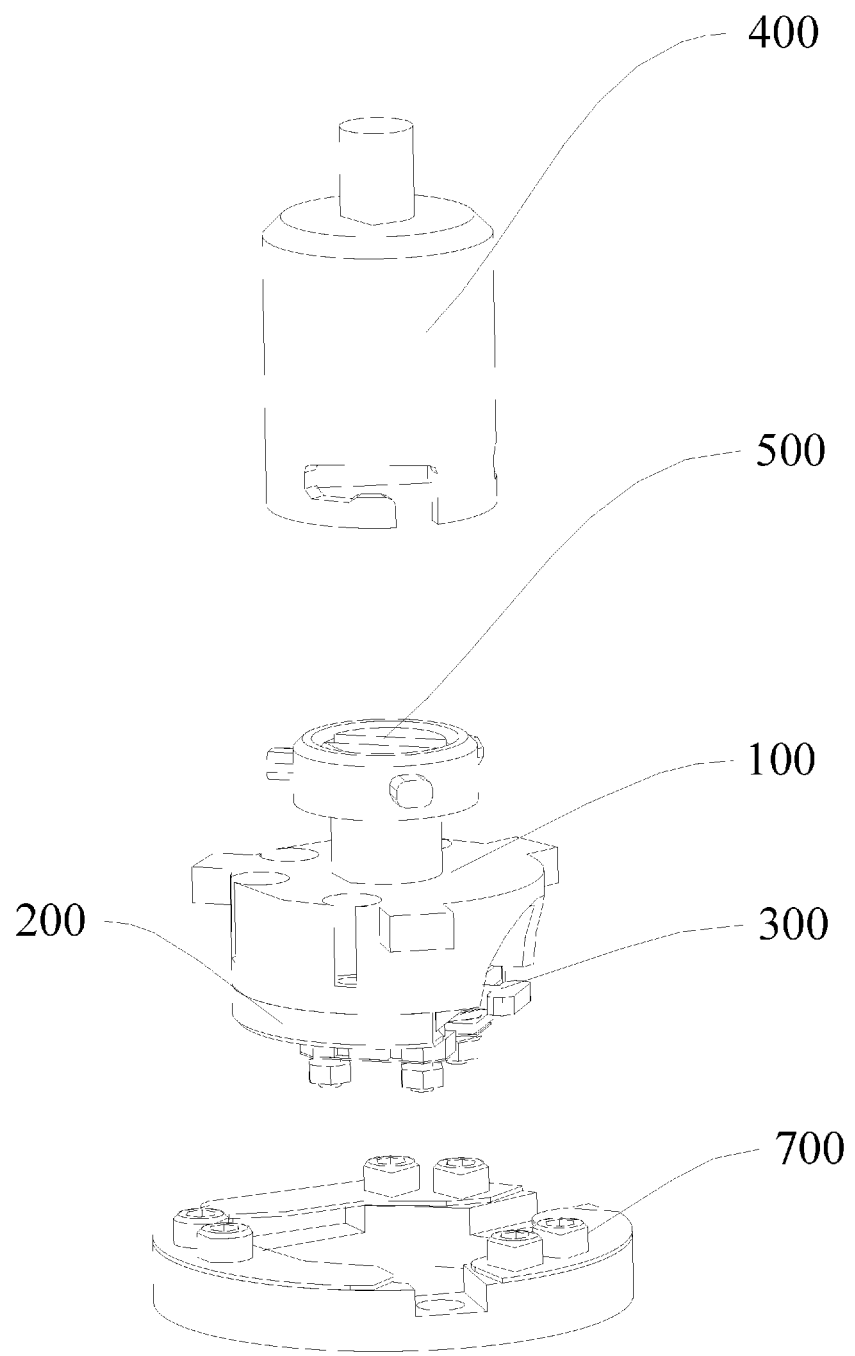
FIG. 5 is a second exploded view of the flat plate sample holder expansion structure used in the vacuum including the cylindrical sample holder gripper and the cylindrical sample holder locking base according to an embodiment of the present disclosure.

Referring to FIGS. 2, 4 and 5, in one of the embodiments, locking ears 131 extending outward in a radial direction are provided on the side wall of the rear portion 130, and a cylindrical sample holder locking base 700 is detachably connected to the adapter 100 by the locking ears 131. The cylindrical sample holder locking base 700 defines locking grooves, and the locking ears 131 are locked into corresponding locking grooves, so that the adapter 100 is fixedly connected to the cylindrical sample holder locking base 700.

Optionally, the number of the locking ears 131 is three, and the three locking ears 131 are evenly distributed on the outer side wall of the cylindrical rear portion 130. Projections of each protruding rod 111 and a corresponding locking ear 131, which are projected on a top surface of the cylindrical rear portion 130, are located in a radial straight line of the cylindrical rear portion 130. Specifically, the cylindrical sample holder gripper 400 clutches the three protruding rods 111, and arranges the adapter 100 and the flat plate sample holder tray 200, which carry the flat plate sample holder 300, on the cylindrical sample holder locking base 700. The adapter 100 and the flat plate sample holder tray 200 are fixed on the cylindrical sample holder locking base 700 when the three locking ears 131 are locked into the locking grooves of the cylindrical sample holder locking base 700 respectively.

Referring to FIG. 2, in one of the embodiments, a notch 132 is provided on the side wall of the rear portion 130 and located at a position corresponding to the opening defined by the flat plate sample holder tray 200, and the notch 132 is capable of receiving a front end of the sample holder gripper 600. The flat plate sample holder gripper 600 extends into the notch 132 to install and remove the flat plate sample holder 300. When the flat plate sample holder gripper 600 is to install the flat plate sample holder 300 on the stepped surface 210, the notch 132 provides a space for the flat plate sample holder gripper 600, thereby making it easier for the flat plate sample holder gripper 600 to install the flat plate sample holder 300 on the stepped surface 210. The flat plate sample holder gripper 600 extends into the notch 132 to detach the flat plate sample holder 300.

In one of the embodiments, materials of the adapter 100 and the flat plate sample holder tray 200 are non-magnetic, thermal conducting materials.

Referring to FIGS. 1 to 6, an operation process of transferring the flat plate sample holder 300 by means of the cylindrical sample holder gripper 400 is as follows.

The adapter 100 and the flat plate sample holder tray 200 are fixedly connected to form the receiving space for fixing the flat plate sample holder 300; the flat plate sample holder gripper 600 installs the flat plate sample holder 300 into the receiving space; the fastening element 500 fastens the flat plate sample holder 300; the cylindrical sample holder gripper 400 clutches the head portion 110 of the adapter 100 and adjusts positions and angles thereof; and the adapter 100 is installed on the cylindrical sample holder locking base 700 and locked by the rear portion 130 of the adapter 100.

In the flat plate sample holder expansion structure used in the vacuum above, the adapter 100 is detachably attached to the flat plate sample holder tray 200. The receiving space for receiving the flat plate sample holder 300 is provided between the adapter 100 and the flat plate sample holder tray 200. The flat plate sample holder 300 is detachably arranged in the receiving space. The cylindrical sample holder gripper 400 is detachably connected to the adapter 100. The cylindrical sample holder gripper 400 transfers the flat plate sample holder 300 and the sample thereon to the low-temperature, high-intensity magnetic field apparatus, thereby achieving the objective of replacing samples in the vacuum environment, and providing key technical solutions for the platform built by combining multiple instruments.

Obviously, the foregoing embodiments are merely examples for clear description, but are not intended to limit the implementation. For those skilled in the art, various changes or modifications may be made on the basis of the above description. It is unnecessary and impossible to provide all embodiments herein. Obvious changes or modifications derived from the present disclosure are still within the protection scope of the present invention.

What is claimed is:

1. A flat plate sample holder expansion structure for use in a vacuum environment, comprising:
    an adapter having a head portion, a neck portion and a rear portion wherein the adapter has a shape of a capital letter I and a through hole is disposed in a center of the adapter wherein the adapter is detachably connected to a cylindrical sample holder gripper;
    a flat plate sample holder tray, wherein the adapter is detachably attached to the flat plate sample holder tray and wherein the flat plate sample holder is detachably and rigidly arranged in a receiving space for receiving a flat plate sample holder provided between the adapter and the flat plate sample holder tray and wherein
    the flat plate sample holder tray defines an opening, and a stepped surface is disposed on a side wall of the opening;
    a fastening screw configured to pass through the through hole whereby the fastening screw abuts on the flat plate sample holder after the flat plate sample holder is installed on the stepped surface; and
    the head portion of the adapter has a shape of a disc;
    protruding rods are arranged on an outer side wall of the head portion; and
    the cylindrical sample holder gripper is detachably connected to the adapter by the protruding rods.

2. The flat plate sample holder expansion structure for use in the vacuum environment according to claim 1, wherein the through hole is a threaded hole fitting the fastening screw;
    the fastening screw is configured to be screwed into the threaded hole to abut on the flat plate sample holder.

3. The flat plate sample holder expansion structure for use in the vacuum environment according to claim 1, wherein the rear portion of the adapter is cylindrical, and a first plurality of threaded holes are evenly arranged in a side wall of the cylindrical rear portion and configured to connect the flat plate sample holder tray.

4. The flat plate sample holder expansion structure for use in the vacuum environment according to claim 3, wherein locking ears extending outward in a radial direction are provided on the side wall of the rear portion, and a cylindrical sample holder locking base is detachably connected to the adapter by the locking ears.

5. The flat plate sample holder expansion structure for use in the vacuum environment according to claim 4, wherein the protruding rod further comprises projections wherein the projections of each protruding rod and a corresponding locking ear, which are projected on a top surface of the cylindrical rear portion, are located in a radial straight line on the cylindrical rear portion.

6. The flat plate sample holder expansion structure for use in the vacuum environment according to claim 5, further comprising a notch defined by the side wall of the rear portion and located at a position corresponding to the opening defined by the flat plate sample holder tray;
    the notch is capable of receiving a front end of the sample holder gripper; and
    the flat plate sample holder gripper is configured to extend into the notch to install and remove the flat plate sample holder.

7. The flat plate sample holder expansion structure for use in the vacuum environment according to claim 1, wherein materials of the adapter and the flat plate sample holder tray are non-magnetic, thermal conducting materials.

8. The flat plate sample holder expansion structure for use in the vacuum environment according to claim 1, wherein three protruding rods are evenly arranged on the outer side wall of the head portion;
    the cylindrical sample holder gripper is provided with position locking components corresponding to the protruding rods respectively; and
    each position locking component comprises an insertion part and a fastening part.

9. The flat plate sample holder expansion structure for use in the vacuum environment according to claim 3, wherein a second plurality of threaded holes are provided at positions on the flat plate sample holder tray corresponding to the first plurality of threaded holes arranged in the side wall of the cylindrical rear portion; the flat plate sample holder tray and the cylindrical rear portion are fixedly connected together by means of threaded connection.

10. The flat plate sample holder expansion structure for use in the vacuum environment according to claim 8, wherein three locking ears are evenly distributed on the outer side wall of a cylindrical rear portion.

* * * * *